United States Patent [19]

Nosenchuck et al.

[11] Patent Number: 5,437,421
[45] Date of Patent: Aug. 1, 1995

[54] MULTIPLE ELECTROMAGNETIC TILES FOR BOUNDARY LAYER CONTROL

[75] Inventors: Daniel M. Nosenchuck, Mercerville; Garry L. Brown, Princeton, both of N.J.

[73] Assignee: British Technology Group USA, Inc., Gulph Mills, Pa.

[21] Appl. No.: 169,599

[22] Filed: Dec. 17, 1993

Related U.S. Application Data

[63] Continuation-in-part of Ser. No. 966,390, Oct. 26, 1992, abandoned, and Ser. No. 986,257, Dec. 7, 1992, Pat. No. 5,320,309, which is a continuation-in-part of Ser. No. 904,570, Jun. 26, 1992, abandoned.

[51] Int. Cl.⁶ .......................... B64C 21/00; F15D 1/12
[52] U.S. Cl. ..................... 244/205; 244/130; 244/204
[58] Field of Search ............... 244/204, 205, 198, 130, 244/201

[56] References Cited

U.S. PATENT DOCUMENTS

| | | | |
|---|---|---|---|
| 2,763,125 | 9/1956 | Kadosch et al. | 60/230 |
| 2,946,541 | 7/1960 | Boyd | 244/205 |
| 3,162,398 | 12/1964 | Clauser et al. | 244/205 |
| 3,224,375 | 12/1965 | Hoff | 244/130 |
| 3,360,220 | 12/1967 | Meyer | 244/205 |
| 3,390,693 | 7/1968 | Ziemer et al. | 137/807 |
| 3,494,369 | 2/1970 | Inoue | 137/13 |
| 3,662,554 | 5/1972 | DeBroqueville | 244/130 |
| 3,851,195 | 11/1974 | Zauderer | 310/11 |
| 3,854,061 | 12/1974 | Rosa | 310/11 |
| 3,880,192 | 4/1975 | Denizov et al. | 137/827 |
| 4,171,707 | 10/1979 | Branover | 137/13 |
| 4,216,800 | 8/1980 | Garnier et al. | 137/807 |
| 4,516,747 | 5/1985 | Lurz | 244/204 |
| 5,040,560 | 8/1991 | Glezer et al. | 137/13 |
| 5,052,491 | 10/1991 | Harms et al. | 166/304 |
| 5,074,324 | 12/1991 | Ng | 137/13 |
| 5,320,309 | 6/1994 | Nosenchuck et al. | 244/205 |

FOREIGN PATENT DOCUMENTS

| | | | |
|---|---|---|---|
| 1031925 | 6/1953 | France | 244/205 |
| 1956760 | 5/1971 | Germany. | |
| 273456 | 1/1969 | U.S.S.R. . | |

OTHER PUBLICATIONS

Nosenchuck, D. M., and Brown, G. L., "The Direct Control of Wall-Shear Stress in a Turbulent Boundary Layer in Single and Multiple Domains," MAE Report T1954 (Princeton Univ.), Aug. 31, 1992.

Nosenchuck, D. M., and Brown, G. L., "Discrete Spatial Control of Wall Shear Stress in a Turbulent Boundary Layer," *Proceedings of Int.1 Conf. on Near-Wall Turb. Flows,* (Ariz. State Univ.), 1993.

Watanabe, T., "Magnetohydrodynamic Stability of a Boundary Layer Flow with Suction or Injection Along a Flat Plate," ZAMM 67 (1987) pp. 27-30.

A. Tsinober, "MHD Flow Drag Reduction," *Viscous Drag Reduction in Boundary Layers,* American Institute of Aeronautics and Astronautics, Inc., 1990.

*Primary Examiner*—William Grant
*Attorney, Agent, or Firm*—Fitzpatrick, Cella, Harper & Scinto

[57] ABSTRACT

The boundary layer of a fluid travelling in a mean-flow direction relative to a surface of a wall of a body is controlled by generating in the fluid a magnetic field $\overline{B}$ having flux lines along the surface of the wall and an electric current density $\overline{J}$ traversing the magnetic flux lines in the fluid to form a control region. The magnetic field $\overline{B}$ and the electric current density $\overline{J}$ create in the control region a force $\overline{J} \times \overline{B}$ that can stabilize or destabilize flow in the boundary layer. A plurality of such control regions can be arranged in an two-dimensional array of control tiles that are periodically actuated in a controlled, predetermined pattern at a critical frequency that provides boundary layer control over a given area.

36 Claims, 11 Drawing Sheets

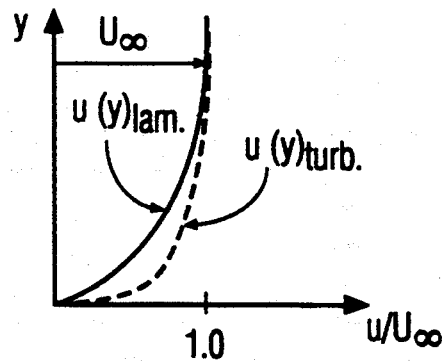
FIG. 2(a)
PRIOR ART
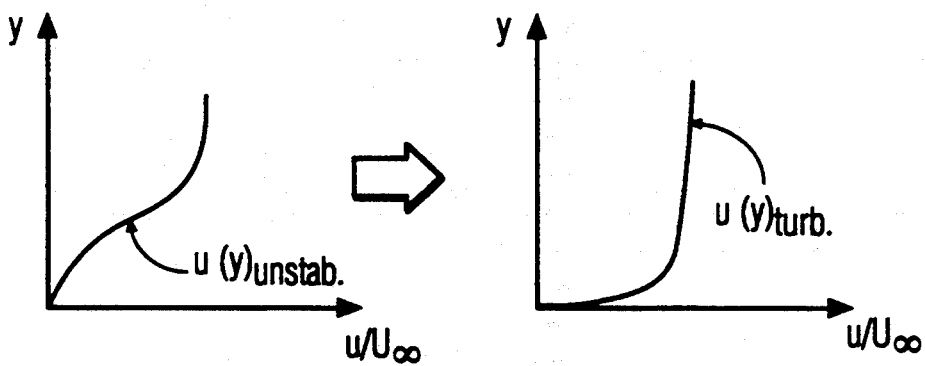
FIG. 2(b)
PRIOR ART
FIG. 2(c)
PRIOR ART

EXPERIMENTAL TILE INSERT

CONTROL OFF

CONTROL ON: 3 TILES ACTIVE

MULTIPLE ELECTROMAGNETIC TILES FOR BOUNDARY LAYER CONTROL

CROSS-REFERENCE TO RELATED APPLICATION

This is a continuation-in-part of Ser. No. 07/966,390, filed Oct. 26, 1992, now abandoned and of Ser. No. 07/986,257, filed Dec. 7, 1992, now U.S. Pat. No. 5,320,309, which in turn is a continuation-in-part of Ser. No. 07/904,570, filed Jun. 26, 1992, now abandoned.

BACKGROUND OF THE INVENTION

1. Field of the Invention

The present invention relates to multiple electromagnetic tiles for magnetically controlling the flow of a fluid along a wall and, more particularly, to magnetic control of the boundary layer on aerodynamic bodies (such as wings, rotors and flaps) and hydrodynamic bodies (such as submarine sails, bowplanes, stern appendages and propellers).

2. Description of the Prior Art

A viscous fluid, and a body completely immersed in the fluid, form a boundary layer at the body's surface when the fluid and the body move relative to each other. That is, the layer of fluid in contact with the body is essentially at rest, while in an area removed from the body, the fluid is moving at its free-stream velocity. The region between the body and that area is known as a boundary layer.

The boundary layer is laminar at low Reynolds' numbers. ($Re = UL/\nu$, where U is a characteristic velocity, such as the free-stream velocity, L is a characteristic dimension of the body, such as the length of a wing chord or boat hull, and $\nu$ is the kinematic viscosity of the fluid.) When the Reynolds' number increases, the boundary layer becomes unstable and turbulent. In some cases, it can "separate" from the body.

FIGS. 1(a) and 1(b) illustrate flow over an airfoil. It will be appreciated that the same principles apply whether the fluid is a liquid or a gas and regardless of the shape of the body.

When the airfoil 10 is operating at a small angle of attack $\alpha$, as shown in FIG. 1(a), the fluid stream 12 with a free-stream velocity $U_\infty$, flows smoothly over the upper surface 14 of the airfoil. The downward deflection of the fluid stream by the airfoil causes an equal and opposite upward lift force to act on the airfoil.

As the angle of attack $\alpha$ increases, as shown in FIG. 1(b), the boundary layer may become turbulent, as indicated by the irregular flow 17. (For purposes of illustration, the boundary layer is depicted in FIG. 1 as much thicker than it is in actuality.) At very high angles of attack the boundary layer may separate from the airfoil, which then stalls. In addition to the loss of lift caused by boundary layer separation, eddies and turbulence 18 develop in the boundary layer.

Instability leading to boundary layer turbulence at a body's surface has several implications.

First, boundary layer turbulence increases viscous drag, which may create the need for additional propulsive force to be applied to the airfoil or other body, which in turn requires more fuel to be expended to maintain the speed of the airplane, submarine, propeller blade, etc., to which the airfoil is attached. Moreover, if the flow separates completely, additional pressure drag is created.

In addition, a turbulent boundary layer exhibits large velocity and pressure fluctuations, which induce noise. Noise can be a significant problem in many environments, one example being submarine control surfaces and propeller screw blades. Pressure fluctuations associated with boundary layer separation can cause vibration, which in turn causes fatigue, which can be a serious problem particularly in metal aircraft parts.

Various approaches have been taken to stabilize boundary layer flow and delay boundary layer separation. One of these approaches includes optimizing the geometry of the airfoil to achieve a maximum possible angle of attack. However, an optimum airfoil shape still only allows the airfoil to operate at limited angles of attack.

Approaches for controlling the boundary layer along a surface of an object have also included providing suction or injection of air through fine slits in the airfoil surface to supply or withdraw energy from the boundary layer. However, in addition to the burden of providing fine slits over the surface of the object, such approaches require extensive tubing networks to supply the force necessary for suction or injection. Accordingly, this approach adds considerably to the overall weight and complexity of the object, which is generally inconsistent with the design objectives of most applications.

The prior art has not yet achieved the capability to provide all of these types of boundary layer control in a very efficient, practical and easily implemented fashion.

SUMMARY OF THE INVENTION

It is an object of the present invention to control the flow over a body for at least the following purposes:

1. Control of shear stress in the fluid in the boundary layer to reduce shear stress in the fluid at the wall and reduce viscous drag on the body.
2. Control of boundary layer separation to decrease or increase the resulting form (pressure) drag on the body, which also can be used to create forces and moments on the body and thereby provide directional control.
3. Control of the characteristics of the acoustic field in the fluid surrounding the body.
4. Control of heat transfer between the body and the fluid.
5. Control of turbulent fluid mixing in the boundary layer.
6. Control of the characteristics of the pressure field in the fluid surrounding the body and the resulting coupled forces.

In accordance with an aspect of the present invention, an apparatus for controlling a boundary layer in a flow of an electrically conductive fluid moving relative to a surface comprises a plurality of selectively actuatable control region tiles distributed over the surface, each tile being bounded by magnetic field generating means for generating in the fluid a magnetic field $\overline{B}(x,y,z,t)$ having flux lines with a predetermined orientation with respect to the direction of relative movement of the fluid and the surface and electric current generating means for generating in the fluid an electric current density $\overline{J}(x,y,z,t)$ traversing the magnetic flux lines, wherein the magnetic field generating means and the electric current generating means are disposed relative to each other such that actuation of a particular tile generates a magnetic field $\overline{B}$ and electric current density $\overline{J}$ that create in the flow a force $\overline{L}(x,y,z,t) = \overline{J} \times \overline{B}$, and control means for selectively actuating the tiles to create the force $\overline{L}$ in the flow along selected tiles for controlling the flow.

In accordance with another aspect of the invention, the tiles are disposed in a two-dimensional array and the control means periodically actuates the tiles in a predetermined pattern.

BRIEF DESCRIPTION OF THE DRAWINGS

The various aspects of the present invention can be best understood by reference to the detailed description of preferred embodiments set forth below taken with the drawings, in which:

FIGS. 2(a) to 2(c) depict boundary layer flow conditions that illustrate principles utilized in the present invention.

DETAILED DESCRIPTION OF PREFERRED EMBODIMENTS

FIGS. 2(a) to 2(c) illustrate generally accepted principles regarding flow conditions in a boundary layer, an understanding of which principles will aid comprehension of the present invention.

FIG. 2 plots the velocity in a fluid at a wall (y=0) of a flat plate and in the region of the boundary layer. At y=0, the velocity u is generally considered to be zero. The velocity increases as y increases, and approaches the free-stream velocity $U_\infty$. The velocity u in the mean-flow direction can thus be expressed as u(y).

The average wall shear stress $\tau_w$ in the mean-flow direction is expressed by the following relation:

$$\tau_w = \mu \left. \frac{\overline{du}}{dy} \right|_{wall} \tag{1}$$

where $\mu$ is the viscosity of the fluid.

In turn, the wall shear stress is related to viscous drag as follows:

$$D_{viscous} = \int_{wall} \tau_w dA \tag{2}$$

where dA is an elemental area of the wall.

Equations (1) and (2) show that $\tau_w$ and $D_{viscous}$ increase as du/dy at the wall increases.

FIG. 2(a) illustrates u(y) for a laminar boundary layer, shown as a solid line, and u(y) for a turbulent boundary layer, shown in a dotted line, for the same external conditions. It will be appreciated that du/dy at the wall is lower for a laminar boundary than for a turbulent boundary layer at the same location on the wall. Accordingly, viscous drag can be reduced if the flow in the boundary layer can be maintained laminar.

However, instability in the flow in the boundary layer can cause the flow to become turbulent. An illustration of this phenomenon is shown in FIGS. 2(b) and 2(c).

FIG. 2(b) illustrates the velocity profile in an unstable boundary layer. The velocity of the fluid immediately adjacent the wall begins to slow down and can even approach zero. This is often an unstable condition, which leads to the replacement of the low velocity fluid near the wall by the higher energy (higher velocity) fluid in the free-stream. The boundary layer thus established is generally turbulent, as illustrated in FIG. 2(c). Accordingly, du/dy at the wall is higher than it would have been if the transition to turbulent flow had not occurred.

Turbulence in the boundary layer has implications beyond the resulting increase in viscous drag. For one thing, the turbulent flow in the boundary layer creates noise because velocity fluctuations inherent in turbulent flow produce pressure fluctuations that tend to propagate into the free-stream flow.

The present invention can stabilize the flow in the boundary layer and thus reduce viscous drag and noise. The present invention can also serve the purposes listed above, in ways described in more detail in the course of the following discussion.

Figure 1A:
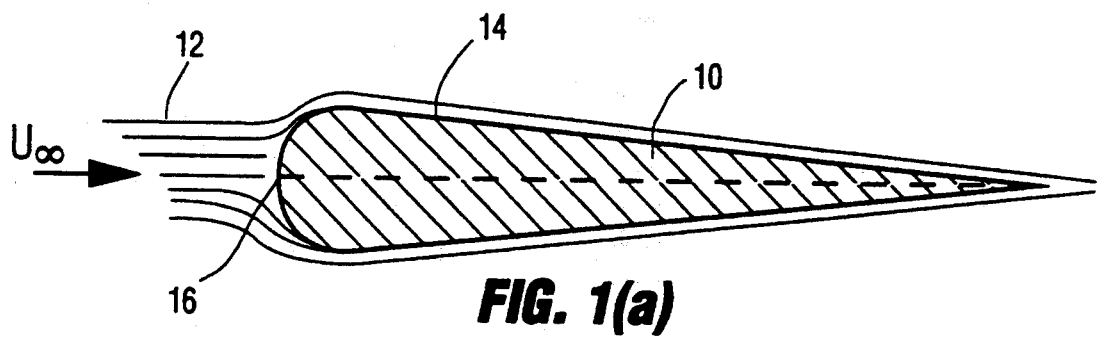
FIGS. 1(a) and 1(b) depict fluid flow around an airfoil.
Figure 1B:
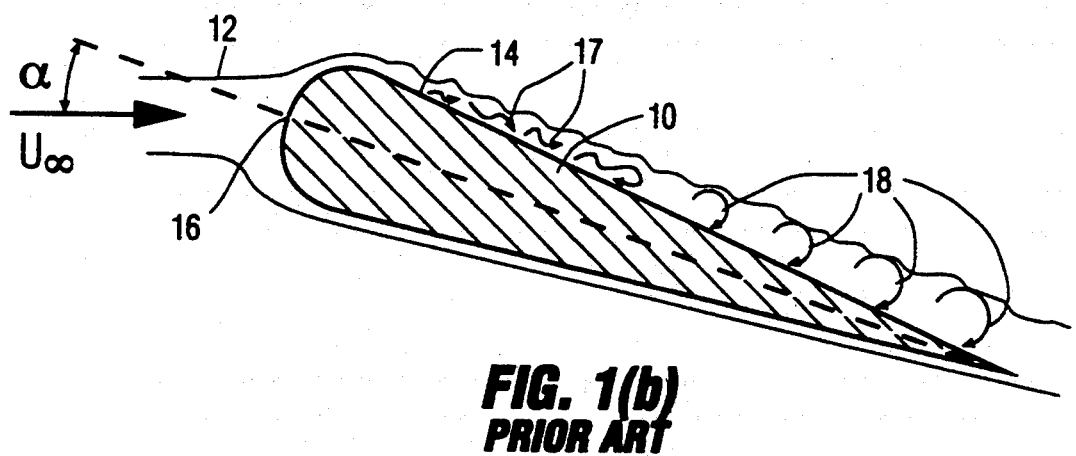
Figure 3A:
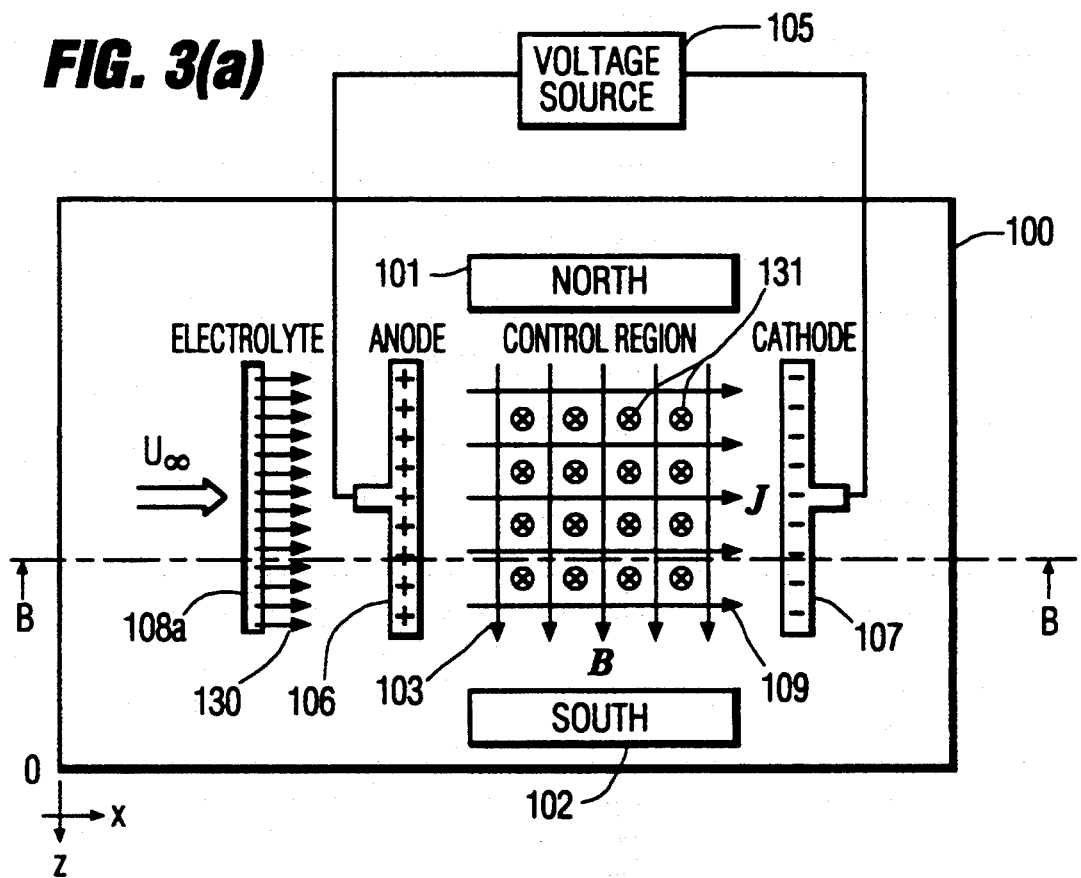
FIG. 3(a) is a planform view of a magnetic boundary layer control device with a single control region that illustrates the principles of the present invention and FIG. 3(b) is a cross-section along line B—B of FIG. 3(a).
Figure 3B:
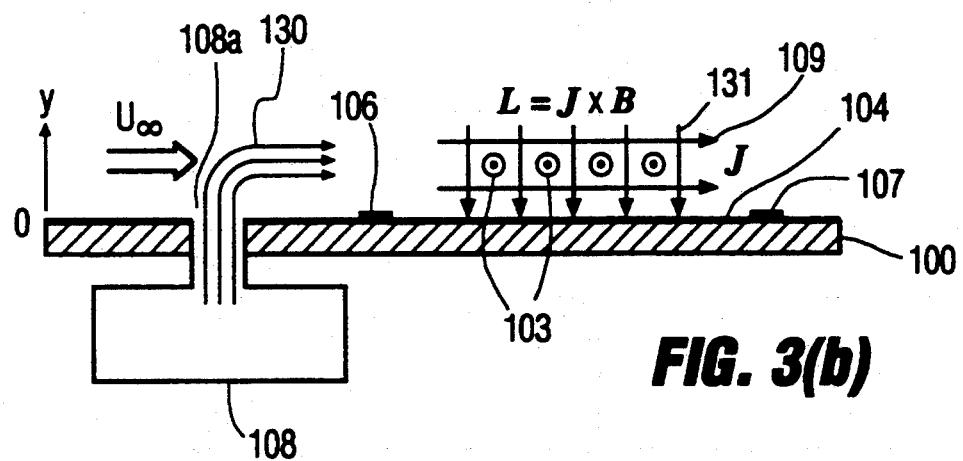

FIG. 3(a) is a planform view of a device illustrating principles underlying the present invention. A wall or flat plate 100, simulating a wing or a control surface, is provided with a magnet having a North pole 101 and a South pole 102 for generating a magnetic field $\overline{B}$ with flux lines 103. The flux lines 103 enter and exit the surface 104 of the wall, thus being generally oriented parallel to the wall surface 104 and normal to the free-stream fluid flow direction x, although they have y-components proximate to the magnets. (The coordinate system used herein is shown in FIGS. 3(a) and 3(b).)

The magnetic poles 101 and 102 shown in FIG. 3 (*a*) are provided by a horseshoe magnet (not; shown) beneath the plate 100 (that is, on the side opposite the surface 104), and the plate is a non-ferrous material that allows free passage of magnetic flux. An electromagnet can also be used.

However, the magnetic poles can be provided by any suitable structure. For example, the poles of one or more magnets can be placed flush with the surface 104 so as to form a part of the surface itself, and can even protrude from the surface.

A voltage source 105 attached across electrodes 106 and 107 generates an electric current density $\bar{J}$, represented by arrows 109, between the two electrodes. of course, if the plate 100 is electrically conductive, the electrodes 106 and 107 are insulated from the plate.

To control the boundary layer using the arrangement shown in FIG. 3, it is highly desirable that the fluid in the boundary layer have a certain degree of electrical conductivity $\sigma$ different from the conductivity of the rest of the fluid. In the device shown in FIGS. 3(*a*) and 3(*b*), an electrolyte 130 is added to the boundary layer by bleeding an electrolyte from a reservoir 108 through a slit 108*a* into the medium to increase the conductivity of a thin layer of the liquid adjacent to the wall.

A direction of the current flow through the conductive fluid is in the direction from an anode electrode 106. to a cathode electrode 107 such that the current density can be expressed generally as a vector $\bar{J}$ parallel to the mean flow direction x of the fluid medium, although the lines of electric current have y-components proximate to the electrodes. As depicted in FIG. 3(*b*), a Lorentz force $\bar{L}$, represented by arrows 31, resulting from the interposition of the electric current and magnetic field, is expressed as $\bar{J} \times \bar{B}$, the vector- or cross-product of $\bar{J}$ and $\bar{B}$ acting in a control region in a direction generally normal to and toward the wall 100, although near the eddies of the control region bounded by the magnetic poles and the electrodes $\bar{J}$ may have significant x- and z-components.

Figure 4:
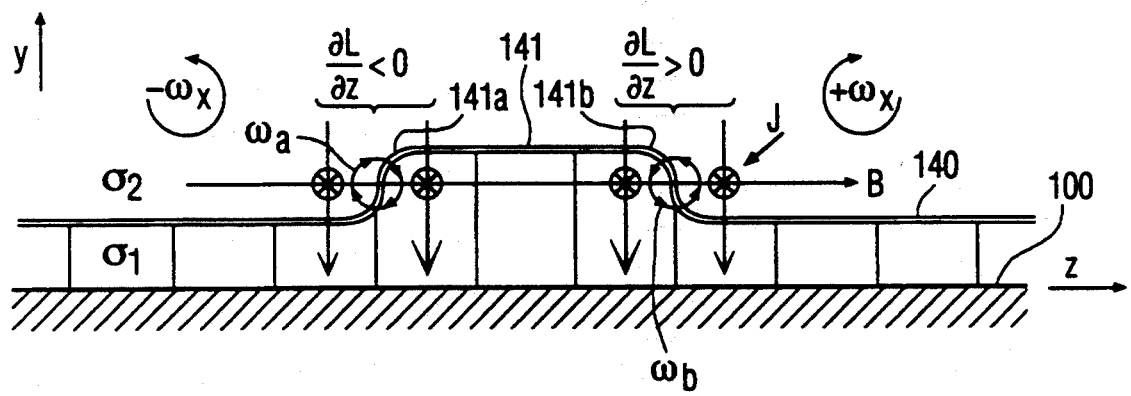
FIG. 4 depicts a section of the fluid flow shown in FIGS. 3(a) and 3(b).

The Lorentz force $\bar{L} = \bar{J} \times \bar{B}$ stabilizes the boundary layer by counteracting regions of positive and negative vorticity $\omega$, in accordance with the mechanism illustrated in FIG. 4.

FIG. 4 is a view looking downstream. in the flow along the plate 100 in FIGS. 3(*a*) and 3(*b*). (That is, a cross-section of the flow in the spanwise (z) direction.) As a result of the introduction of the electrolyte 130, the fluid has a higher conductivity $\sigma_1$ in the near-wall region than the conductivity $\sigma_2$ in regions outside the near-wall region. As those skilled in this art know, the "near-wall" region is that part of the flow in the boundary layer responsible for most of the turbulence production. In the near-wall region, viscous forces predominate over momentum forces.

Figure 5:
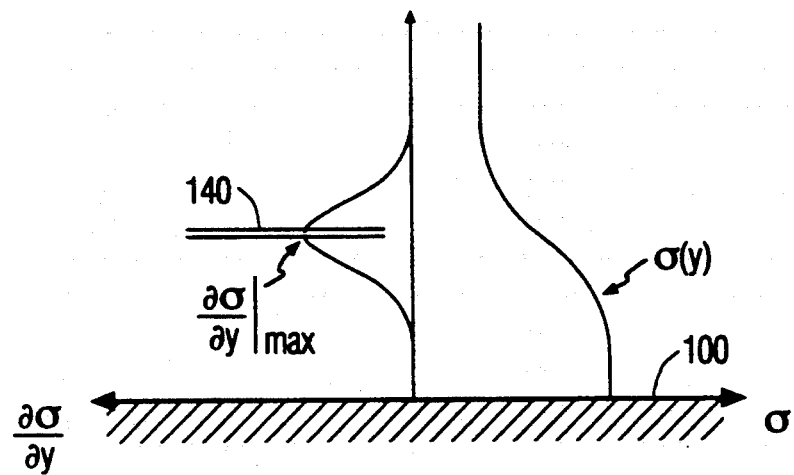
FIG. 5 is a qualitative plot relating to the conductivity of the fluid flow shown in FIGS. 3(a) and 3(b).

The double line 140 denotes where the gradient of the conductivity $\sigma$ in the y-direction is at a maximum in the near-wall region. Optimally, the conditions under which the electrolyte 130 is introduced into the fluid flow are controlled so that the conductivity gradient is at a maximum at a predetermined distance from the wall, in accordance with principles discussed below. In FIG. 5, the right side qualitatively illustrates the conductivity variation in the y direction (y=0 at the surface of plate 100) and the left side plots the conductivity gradient for the conductivity illustrated on the right-hand side. The double line 140 is drawn in FIG. 4 at the distance from the wall where the conductivity gradient is at a maximum, as shown in FIG. 5.

This distance is typically between 10 and 30 wall units (y+), that is, $10 < y^+ < 30$, although it can vary depending on the properties of a particular fluid flow. A "wall unit" is a dimensionless number, usually expressed as y+, used by those skilled in the art to express distance when phenomena being measured relate to the flow conditions along a surface. In particular, the vertical distance from the wall of a flat plate may be expressed as:

$$y^+ = y \frac{u_\tau}{\nu} \quad (3)$$

where $\nu$ is the kinematic viscosity of the fluid and $u_\tau = \sqrt{\tau_w/\rho}$, $\tau_w$ being wall shear stress (see Equation 1) and $\rho$ being the density of the fluid.

Referring back to FIG. 4, turbulence in a boundary layer is generally associated with regions of positive and negative vorticity $+\omega$ and $-\omega$. As illustrated in FIG. 4 by the raised portion 141 of the double line, this vorticity is believed to be one of the mechanisms at work in the lift-up of near-wall low-momentum fluid and its replacement by higher momentum fluid from regions further from the wall, that is, the phenomenon explained previously in connection with FIGS. 2(*a*) to 2(*c*).

While the exact mechanism by which such an arrangement prevents this lift-up of a near-wall fluid is not completely understood, due to the as yet incomplete understanding of the feedback mechanisms that stimulate the creation of near-wall streamwise vorticity ($+\omega$ and $-\omega$), FIG. 4 illustrates one of the mechanisms believed to be at work. Since the boundary between the low- and high-conductivity fluid is displaced, as seen by the raised portion 141 of the double line in FIG. 4, the Lorentz force $L_y$ superimposed on the flow exhibits a gradient in the areas where that boundary is dislocated.

At the dislocation 141a on the left-hand side, $L_y$ is decreasing in the z-direction, to create streamwise vorticity $\omega_a$ in the positive direction that counteracts the vorticity $-\omega$ that caused the dislocation 141a in the boundary layer. At the right-hand dislocation 141b, $L_y$ is increasing in the z-direction, thus creating streamwise vorticity $\omega_b$ in a negative direction that counteracts the $+\omega$ at that location. The bolder vector for $L_y$ in FIG. 4 indicates a stronger force. Thus, since $L_y$ (which is negative because it is directed in the minus y-direction) becomes larger in the z-direction for the left-hand dislocation 141a, and smaller in the z-direction for the right-hand dislocation 141b, it creates vorticities in the opposite directions from $-\omega$ and $+\omega$, respectively.

The gradient of $L_y$ in the z-direction creates the counteracting vorticities because the near-wall region conductivity $\sigma_1$ is higher than the more remote conductivity $\sigma_2$, and the higher conductivity fluid carries more current. Accordingly, $L_y$ where there is more such fluid, such as where the boundary layer has been lifted up, is larger than in the adjacent areas.

FIG. 4 illustrates how this arrangement is believed to counteract flow disturbances in the spanwise (z) direction. It is believed that the invention counteracts disturbances in the streamwise (x) direction in the same manner. That is, a schematic cross-section of the flow taken in the streamwise (x) direction instead of the spanwise (z) direction would look much the same as FIG. 4.

It is preferable when a conductivity gradient is provided that it be a maximum at the edge of the near-wall region. However, that is not necessary. It is believed to be sufficient simply to have a conductivity gradient in the y-direction in the near-wall region in order to generate the $L_y$ gradients that create vorticity. That is, if $\delta$ is the height of the near-wall region, then there should be a conductivity gradient in the y-direction between y=0 and y=$\delta$, with the maximum gradient preferably being at y=$\delta$.

It will be appreciated that by reversing the polarity of either the magnetic field or the electric current density, the force $\bar{J} \times \bar{B}$ can be provided in a direction normal to but directed away from the wall 100, which will result in the flow medium being pushed in a direction away from the wall surface 104. This effect can be used to disturb and destabilize the boundary layer by creating the dislocating vortices $-\omega$ and $+\omega$.

In the arrangement illustrated in FIG. 3, the current density and the magnetic field are normal to each other. This of course provides a maximum force $\bar{J} \times \bar{B}$ for given magnetic flux density B and current density J. However, it will also be appreciated that the electric current density and the magnetic field need not be perpendicular to each other as shown in these figures. Any arrangement which provides a current and magnetic field traversing each other will result in a force $\bar{J} \times \bar{B}$.

Arrangements besides that depicted in FIG. 3 are also possible in accordance with the present invention. For example, the electrodes could be arranged so that the current flows across the mean fluid flow direction while the magnetic flux lines are along the flow direction. Or the amount of current density and strength of the magnetic field can be varied with time to change that force.

In one of its most general aspects, the present invention provides for varying the magnetic field and current density over the entire control region and with time to provide boundary layer control effects precisely tailored to any particular flow condition. That is, the magnetic field can be expressed as a function $\bar{B}(x,y,z,t)$ and the current density can be expressed as a function $\bar{J}(x,y,z,t)$, so that the resulting force $\bar{L}=\bar{J}\times\bar{B}$ is a function $\bar{L}(x,y,z,t)$. Accordingly, to provide the desired control of the flow around an object it is possible to provide $\bar{B}(x,y,z,t)$ and $\bar{J}(x,y,z,t)$ that will provide the desired flow effects.

Although it may be possible under some circumstances to provide functions $\bar{B}(x,y,z,t)$ and $\bar{J}(x,y,z,t)$ that will produce the proper $L_y$ variations (see FIG. 4), an expedient manner of producing those variations in the arrangement shown in FIG. 3 is by providing a layer of different, preferably higher, conductivity fluid in the near-wall region. Accordingly, an aspect of the present invention involves the provision of such a layer. In such a case, $\bar{B}$ and $\bar{J}$ need not be varied to produce the $L_y$ variations necessary for boundary layer control, although for given desired flow effects $\bar{B}$ and $\bar{J}$ may still be varied spatially and temporally.

The present invention has numerous significant implications. It can reduce viscous drag by stabilizing the boundary layer and preventing transition to turbulent flow. In addition, it can inhibit velocity fluctuations in the near-wall region over a wide area of a flow surface and thereby damp and dissipate velocity fluctuations in the free-stream flow. This can significantly affect the acoustic field in the fluid surrounding the body. And by stabilizing the boundary layer and preventing transition to turbulent flow, the present invention can reduce heat transfer between the fluid and the body, which is of great potential significance in reducing the temperatures to which space vehicles are subjected upon reentry into the Earth's atmosphere.

On the other hand, providing $\bar{J}\times\bar{B}$ directed away from the body can destabilize the flow ill the boundary layer and induce transition to turbulent flow. In that manner, heat transfer between the fluid and the body can be enhanced, which is important in applications such as heat exchanger design. Moreover, turbulent boundary layer flow enhances fluid mixing, which can have important ramifications in combustion and chemical processing applications (where two fluids may flow along opposite surfaces of a body to be mixed at the body's trailing edge). And a turbulent boundary layer is ordinarily less prone to separation than a laminar boundary layer, so that inducing turbulent boundary layer flow can delay separation.

Controlling boundary layer separation is, of course, important because of both the form (pressure) drag and the unstable pressure fluctuations associated with such a flow condition. Separation greatly increases the drag on the body due to the altered distribution of pressure when the flow separates. Accordingly, preventing separation reduces such drag. Separation can also create a fluctuating pressure field in the fluid that subjects the body to coupled forces which can cause fatigue. Delaying separation (by inducing turbulent boundary layer flow) or inhibiting separation (by providing a strong $\bar{J}\times\bar{B}$ force toward the body), can reduce these pressure fluctuations and the resulting fatigue.

By the same token, preventing or inducing separation under controlled conditions can be used to create forces and moments on the body and provide directional control.

One aspect of the present invention uses those principles to provide efficient boundary layer control over a wide area.

Results of experiments using a single control region indicate that it becomes less capable of providing the desired boundary layer control as the distance between the electrodes, $D_e$, and the distance between the magnetic poles, $D_B$, become larger. The reason lies in the fact that the present invention seeks to control the fluid in the near-wall region of the flow. Accordingly, a certain magnitude magnetic field and electric current density is desired in that region. As $D_B$ and $D_e$ increase, the magnitudes of the magnetic field and current density at the near-wall region actually decrease for a given strength magnet and electric current. Thus, one way to increase the size of the control region while maintaining the same degree of flow control is simply to increase the strength of the magnet or current or both. That approach results in an inefficient use of the magnetic field and current density being generated, since a only a small percentage of each is in the near-wall region contributing to flow control However, the present invention enables flow control over a large area while efficiently using the magnetic field and electric current density.

The optimum distances $D_e$ and $D_B$ for maintaining a certain percentage of the magnetic flow and current in the near-wall region can be calculated using Maxwell's equations. If that percentage is chosen as, say, 50%, then Maxwell's equations can be used to show that $$\frac{D_e}{\delta} \sim \frac{D_B}{\delta} \sim 10. \quad (4)$$

Since $\delta$ is a small distance, the value of $D_e$ and $D_B$ required to maintain 50% of the magnetic field and electric current within the near-wall region are also very small.

That consideration illustrates another principle underlying the present invention, namely the provision of a plurality of separately actuatable control region tiles. With such an arrangement, flow control over a large area can be provided with less magnetic flux and electric current than would be required to provide flow control for that area using a single control region.

Figure 6:
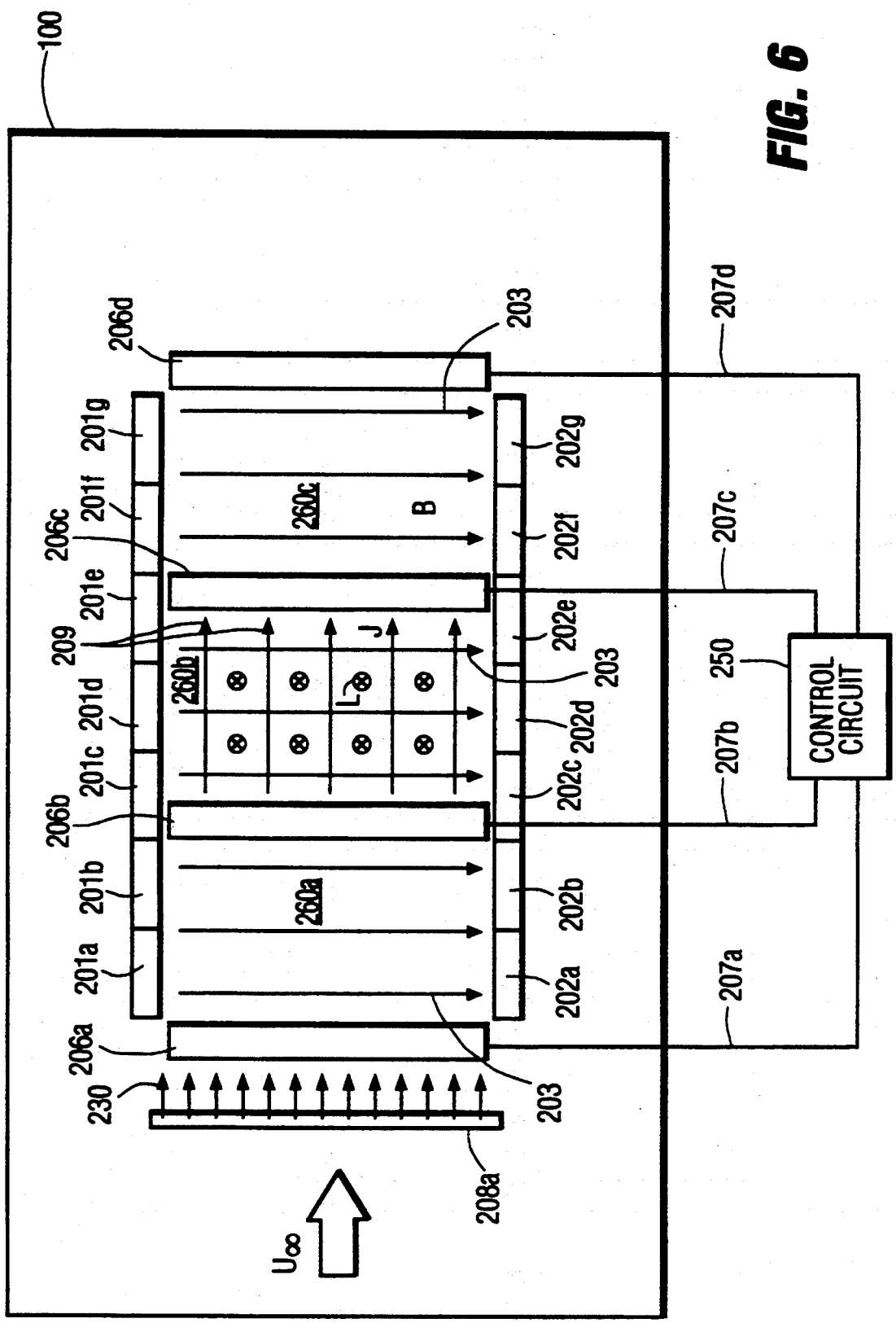
FIG. 6 shows a one-dimensional array of control region tiles that illustrates one embodiment of the present invention.

FIG. 6 schematically illustrates the present invention as applied to a one-dimensional array of individual control region tiles.

A wall or flat plate 200, simulating a wing or control surface as in FIGS. 3(a) and 3(b), is provided with a series of magnets having North poles 201a, 201b, ..., 201g, and South poles 202a, 202b, ... 202g. These magnets generate a magnetic field $\overline{B}$ with flux lines 203. A plurality of electrodes 206a, 206b, 206c and 206d are spaced from each other to provide three control tiles 260a, 260b, and 260c, disposed in FIG. 6 in a one-dimensional array in the direction of fluid flow. To provide a layer of higher conductivity fluid in the near-wall region, a slot 208a bleeds an electrolyte 230 into the fluid, in a fashion similar to that illustrated in FIGS. 3(a) and 3(b).

Each electrode 206 is connected to wiring 207 that leads to a control circuit 250. The control circuit is made from known components and is capable of selectively applying a potential across each electrode pair through wiring 207. That is, the control circuit 250 can apply a potential across any pair of electrodes 206a-206b, 206b-206c or 206c-206d in any polarity.

FIG. 6 shows the case where electrodes 206a and 206b are at the same potential, electrodes 206b and 206c are at potentials that make 206b an anode electrode relative to electrode 206c, and electrodes 206c and 206d are at the same potential. In that case, there is an electric current $\overline{J}$ between the electrodes 206b and 206c. This electric current is represented by the vector $\overline{J}$ and arrows 209. Accordingly, a force $\overline{L} = \overline{J} \times \overline{B}$ is generated in the actuated tile 260b.

When any one of the tiles 260a, 260b or 260c is actuated, the flow along that tile is quickly stabilized. However, when the tile is deactuated, it may take a relatively long time for the flow to destabilize. Accordingly, it is possible to actuate the tiles sequentially so that each is actuated for a relatively short length of time, while still maintaining stable flow over all of the tiles.

Example No. 1

A test rig was set up to perform a feasibility study using the device shown in FIG. 6. The rig was tested in a flow channel in the test setup depicted in FIG. 7. The rig, shown in FIG. 7, consisted of a plate 609 about four meters long, having components similar to those shown in FIG. 6 mounted thereon. The boundary layer control device 608 consisted of seven permanent magnets 601a to 601g. The poles of each magnet were about 18 cm. apart, that is, the control region was 18 cm. wide in the spanwise direction. Stainless steel (Type 304) electrodes 606a, 606b, 606c and 606d were provided approximately 8 cm. apart. They were approximately 1 cm. wide and 8 cm. long.

Anode and cathode voltage were established for each test run. The electrode 606a was maintained at the anode voltage and the 606d was maintained at the cathode voltage. The electrodes 606b and 606c were alternately switched between the anode and cathode voltages by a control unit (not shown in FIG. 7). The three control region tiles were sequentially actuated for 100 msec. each (with a duty cycle of $\frac{1}{3}$). $B_z$ for each tile was about 160 gauss and $J_x$ for each tile was about 10 ma/cm$^2$.

Various electrolytic substances were injected into the flow medium from a slot 604. One such electrolytic substance consisted of a dilute solution of NaOH containing a fluorescing disodium fluorescein dye to obtain flow visualization in a manner discussed below.

Figure 7:
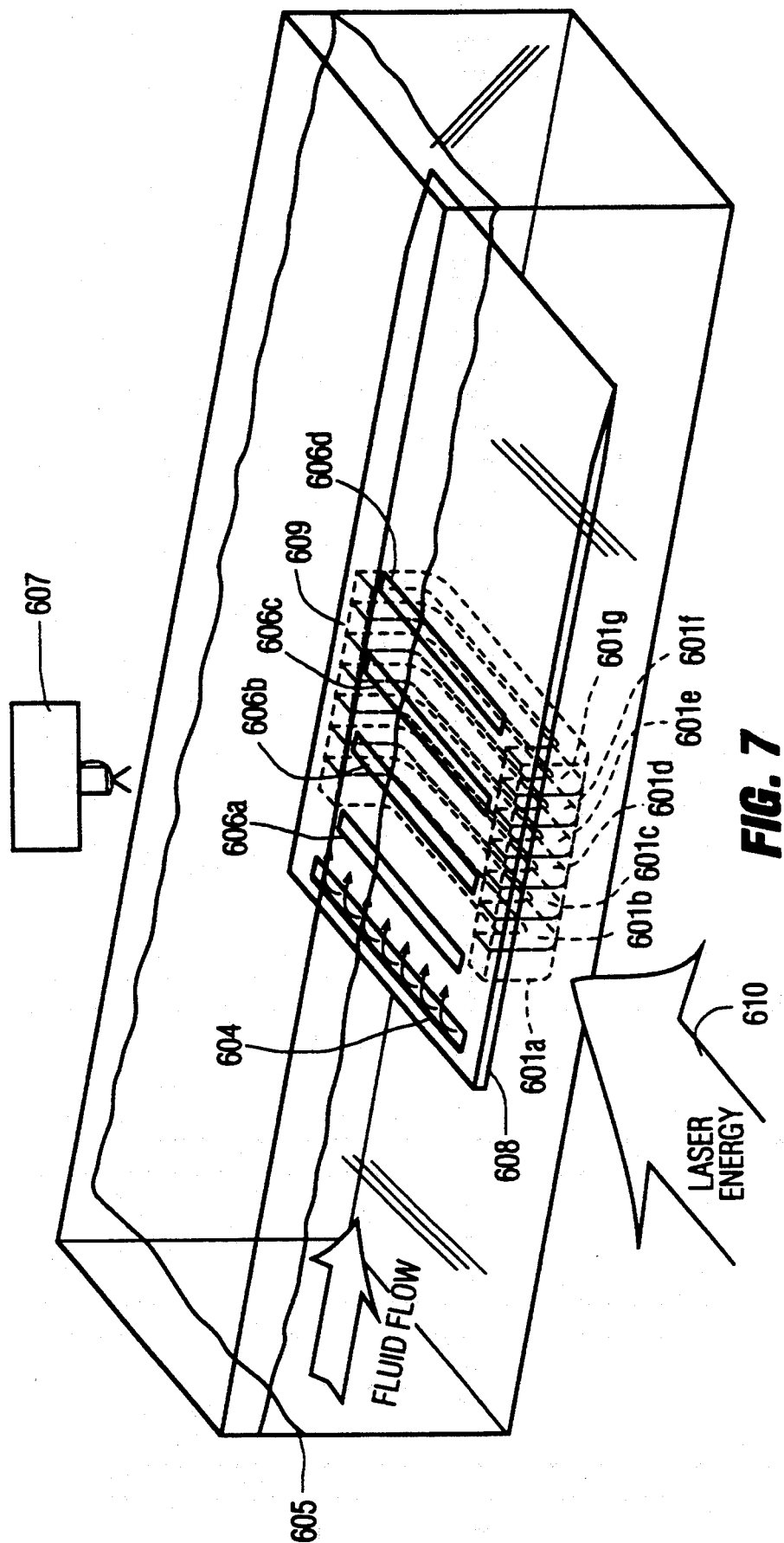
FIG. 7 shows a test setup used to demonstrate the efficacy of an embodiment of the invention using a one-dimensional array of control region tiles like that shown in FIG. 6.

The test tank shown in FIG. 7 consisted of a tank approximately 1.5 meters wide, 0.5 meters high and six meters long. The test fluid 605 was set to flow at 15 cm/sec. A laser was arranged to provide a thin sheet of laser energy 610 along the boundary layer at $y^+ \approx 20$ for activating the fluorescing dye in a thin layer along the surface of the plate to obtain visualization of the boundary layer. A video recorder 607 was provided for recording the results of the experiment.

In experiments performed on the test rig, a turbulent spot was produced upstream of the magnetic boundary layer control device 608 using a mechanical tripping device. It was observed that when the spot entered the control region of the device, turbulence in the boundary layer of plate 609 disappeared under the above conditions. The flow visualization techniques also confirmed qualitatively that reversing the flow of current increased the turbulence in the control region.

Figure 8A:
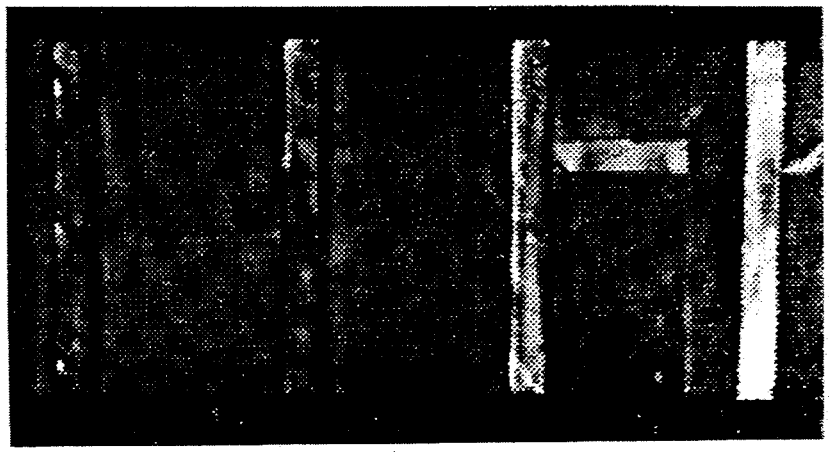
FIGS. 8(a) to 8(c) are plan views of the flow in the test set-up shown in FIG. 7, as visualized using a fluorescent dye.
Figure 8B:
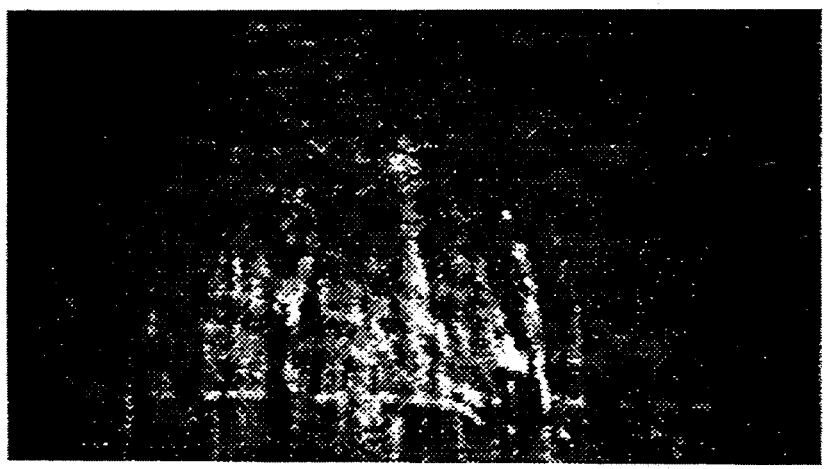
Figure 8C:
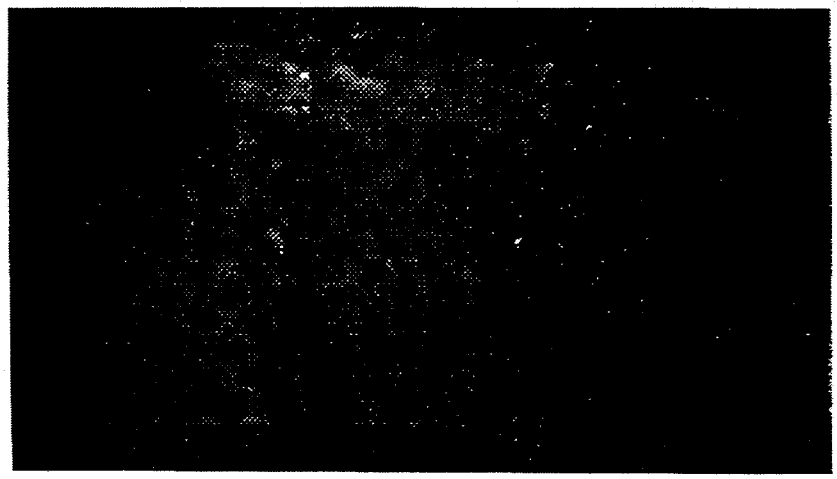

FIG. 8 includes three actual prints of the test rig shown in FIG. 7. FIG. 8(a) shows the plate 609 with the boundary layer control device 608 in place. The electrodes 606a are clearly visible. FIG. 8(b) is a print the visualized flow over the plate when a turbulent spot is produced upstream and the tiles are not actuated. The brighter regions evidence unstable flow at the location of the laser sheet at $y^+ \approx 20$. FIG. 8(c) is a print of the visualized flow over the plate under the same conditions as in FIG. 8(b), except that the tiles have been actuated as described above. The bright spots have essentially disappeared, indicating that the flow in the boundary layer has stabilized.

Figure 9:
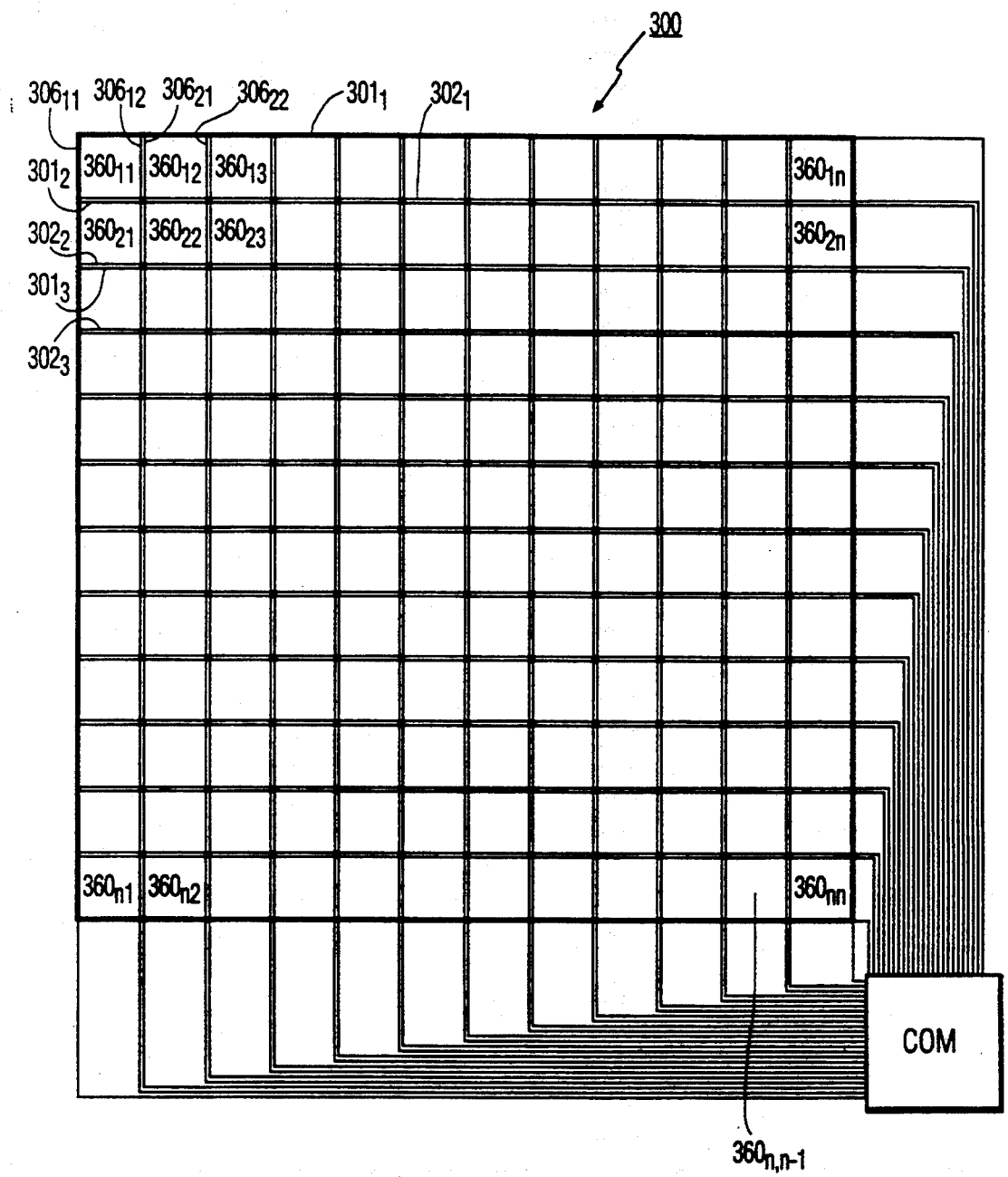
FIG. 9 shows one embodiment of a two-dimensional array of control region tiles.

The present invention also contemplates a two-dimensional array 300 of n tiles as shown in FIG. 9.

Each tile has associated with it a pair of electrodes and a pair of magnetic poles provided by electromagnets. For example, the first row of tiles $360_{11}$ to $360_{1n}$ has associated with it electromagnets $301_1$, and $302_1$; the second row of tiles $360_{21}$ to $360_{2n}$ has associated with it electromagnets $301_2$ and $302_2$; etc. By the same token, the first column of tiles $360_{11}$ to $360_{n1}$ has associated with it electrodes $306_{11}$ and $306_{12}$; the second column of tiles $360_{12}$ to $360_{n2}$ has associated with it electrodes $306_{12}$ and $306_{21}$; etc.

By suitably addressing the electromagnets and electrodes associated with the tiles, it is possible to provide a high degree of flow control over a large area. Of course, the electrodes and electromagnets must be addressed in a fashion that ensures that no two tiles in close proximity are simultaneously actuated. Otherwise, the magnetic fields and electric currents would not be provided in the proper direction for flow control. For example, the adjacent electrodes in two adjoining tiles could not be made simultaneously to have different polarities, since current would then flow between such electrodes rather than along the tile surface.

A microcomputer COM can be programmed to provide an appropriate addressing sequence depending on flow conditions such as free stream velocity, fluid density, angle of attack (if the array 300 is on a lifting body such as an aircraft wing or submarine control surface), etc. The present invention thus enables flow control over a large area, and may reduce the strength of the magnetic field and the electric current required for the same area if only one control region were provided for such area. It also more readily enables flow control without providing a conductivity gradient in the fluid.

FIG. 10 shows another embodiment of the invention that demonstrates flow control using a two-dimensional array of control region tiles. The array is formed by a series of spaced-apart permanent magnets 401, 402, 403, 404 and 405. The poles are arranged as alternate North and South poles, as indicated by the designations "N" and "S" in FIG. 10, and provide magnetic fields indicated by the flux lines B. Sixteen control region tiles $406_{11}$, $406_{12}$, $406_{13}$, . . . , $406_{43}$, $406_{44}$ are formed by separately actuatable electrodes $406_{a1}$, $406_{a2}$, $406_{a3}$, $406_{a4}$, $406_{a5}$, $406_{b1}$, $406_{b2}$, . . . , $406_{d3}$, $406_{d4}$, $406_{d5}$.

The sixteen tiles are actuated in four sub-arrays 411, 412, 413 and 414, each having four tiles actuated at different times. The tiles marked $\phi_1$ (referred to as "equal-phase" tiles because they are all actuated at the same time) are actuated by passing current $\overline{J}$ between electrode pairs $406_{a3}$ and $406_{a4}$, $406_{b1}$ and $406_{b2}$, $406_{c3}$ and $406_{c4}$, and $406_{d1}$ and $406_{d4}$. Then, the $\phi_1$ tiles are turned off and the equal-phase tiles designated $\phi_2$ are all actuated together; the equal-phase tiles $\phi_3$ and $\phi_4$ are likewise actuated in turn. In other words, in a given time period all equal-phase tiles will be actuated, and the actuation time of each such tile is 25% of the total actuation time of all four tiles in a sub-array.

Figure 10A:
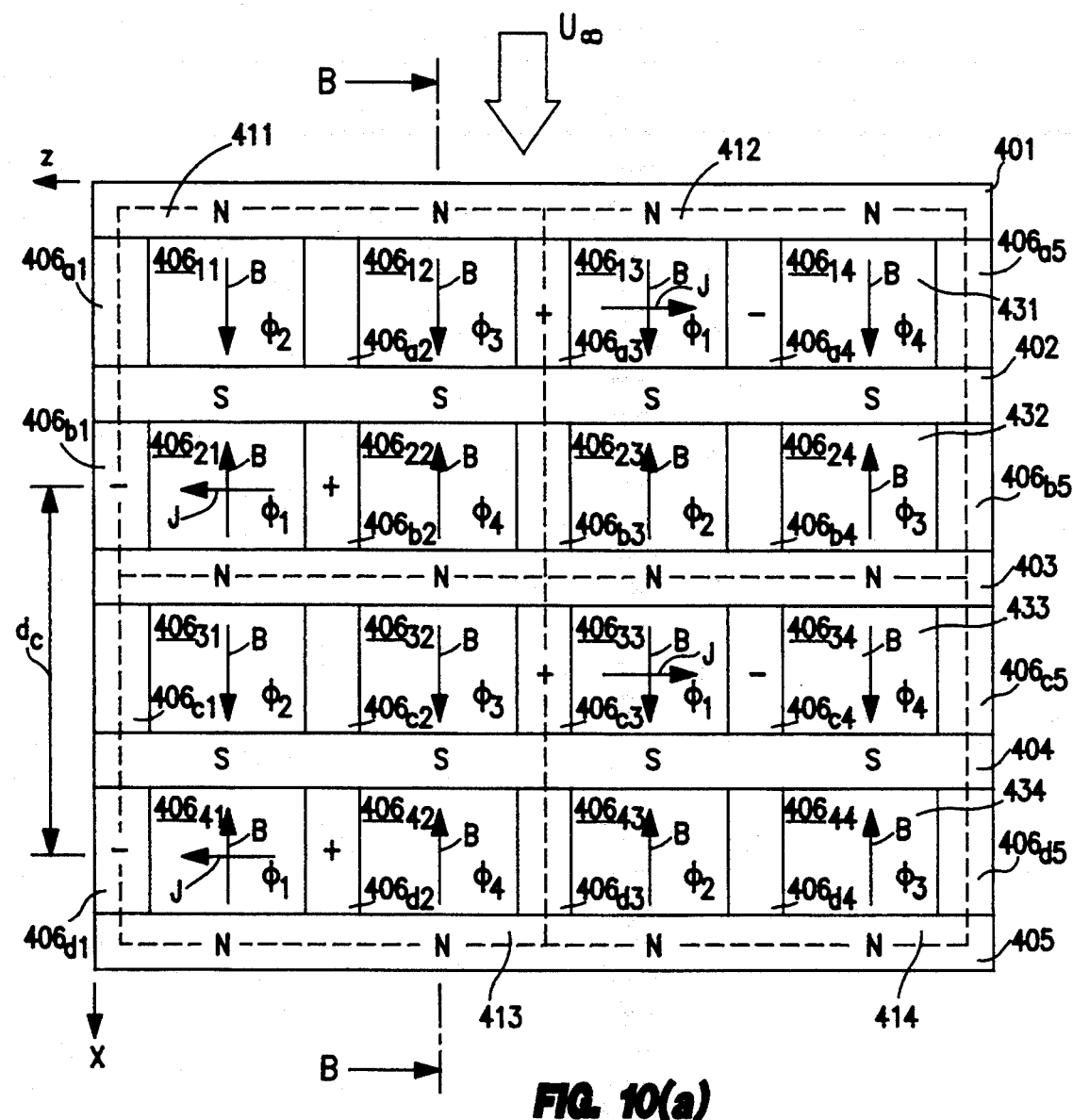
FIG. 10(a) shows another embodiment of a two-dimensional array of control region tiles and FIG. 10(b) is a cross-section along line B—B of FIG. 10(a), showing an alternate embodiment of a magnet arrangement that can be used in the present invention.

In FIG. 10(a), the equal-phase tiles in sub-arrays along the x-direction (the direction of the free-stream flow) are actuated in the same order. That is, the equal-phase tiles are arranged similarly in sub-arrays 411 and 414 and in sub-arrays 412 and 414. However, in the spanwise (z) direction, the equal-phase tiles are shifted from their locations in the adjacent sub-array. Thus, the equal-phase tiles comprise four groups of tiles and each sub-array includes a tile in one of those groups. More or fewer sub-arrays can be used for flow control depending on the flow conditions and the area over which the flow is to be controlled. The size of the tiles varies depending on the freestream flow conditions. Typically, the dimensions of the sides of each tile have an order of magnitude about twice a characteristic thickness of the boundary layer on the plate.

The location of each group of single-phase tiles is chosen to provide a fully closed electrical circuit at each actuated tile. That is, it is preferable that there be no electrical current between actuated tiles in different sub-arrays; for example, it is believed that the topology shown in FIG. 10(a) effectively prevents current from flowing between electrodes bounding different $\phi_1$ tiles when all of the $\phi_1$ tiles are actuated. The same is true for the $\phi_2$, $\phi_3$ and $\phi_4$ equal-phase tiles. Those skilled in the art will be able to construct different topologies, using different numbers of control region tiles in each sub-array and/or different actuation patterns. Such modifications are intended to be within the scope of the present invention.

FIG. 10(a) shows the $\phi_1$ tiles actuated, the y component of the resulting $\overline{L}$ ($\overline{J}\times\overline{B}$) force being downward. This is true for all tiles. That is, when the $\phi_2$ tiles are actuated, the electrodes $406_{a1}$, $406_{a2}$, $406_{b3}$, $406_{b4}$, etc., are connected to potentials that make the current flow between electrode pairs ($406_{a1}$ and $406_{a2}$, $406_{b1}$ and $406_{b2}$, etc.) in a direction to create an $\overline{L}$ force generally into the surface of the thus-defined control region. This control of the electrodes' potentials over time is provided by circuitry easily constructed by one skilled in the art.

Figure 10B:
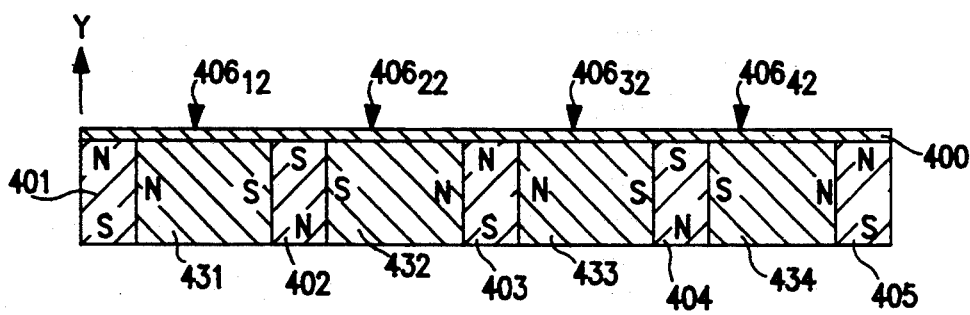

FIG. 10(b) shows the arrangement of the magnets beneath the plate 400 (omitted from FIG. 10(a) for clarity). This embodiment uses an alternate arrangement of the magnets, which has been found to improve the flow control provided by the present invention. The primary magnets 401, 402, 403, 404 and 405 are arranged as shown to provide the North and South poles that define control region tiles as shown in FIG. 10(a). Linking magnets 431, 432, 433 and 434 are coexistensive in the z-direction with the primary magnets 401 to 405. They are arranged with their North and South poles corresponding to the North and South poles of the adjacent primary magnets that define the control region tiles. For example, the North pole of primary magnet 401 and the South pole of primary magnet 402 define the first row of control region tiles $406_{11}$ to $406_{14}$. Accordingly, the linking magnet 431 is disposed with its North pole adjacent the primary magnet 401 and the South pole of the primary magnet 402. This arrangement provides the desired magnetic flux density with less magnetic mass (that is, smaller magnets).

The optimum frequency of actuation of the equal-phase tiles is determined experimentally. It has been found that there is a critical frequency at which a condition analogous to resonance is attained. That frequency can be expressed by the formula:

$$f_{crit.} \propto \frac{U_\infty}{d_c} \quad (5)$$

where $U_\infty$ is the free-stream velocity and $d_c$ is the distance between equal-phase tiles, as shown in FIG. 10(a).

Figure 11:
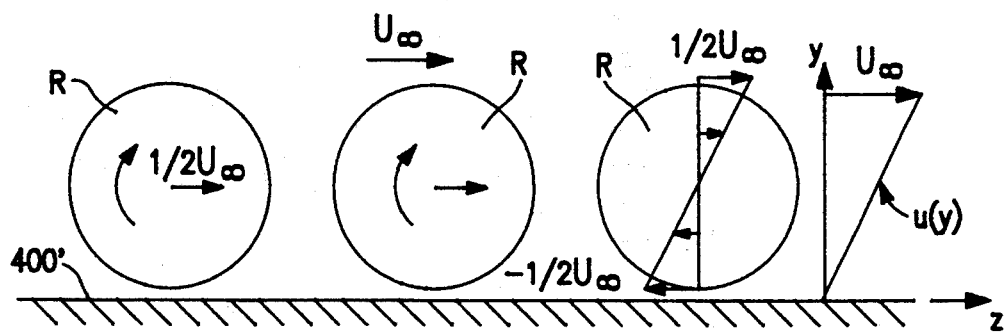
FIG. 11 is a conceptualized cross-sectional view of the flow conditions over an array in accordance with the present invention when the control region tiles are actuated at the critical frequency.
Figure 12:
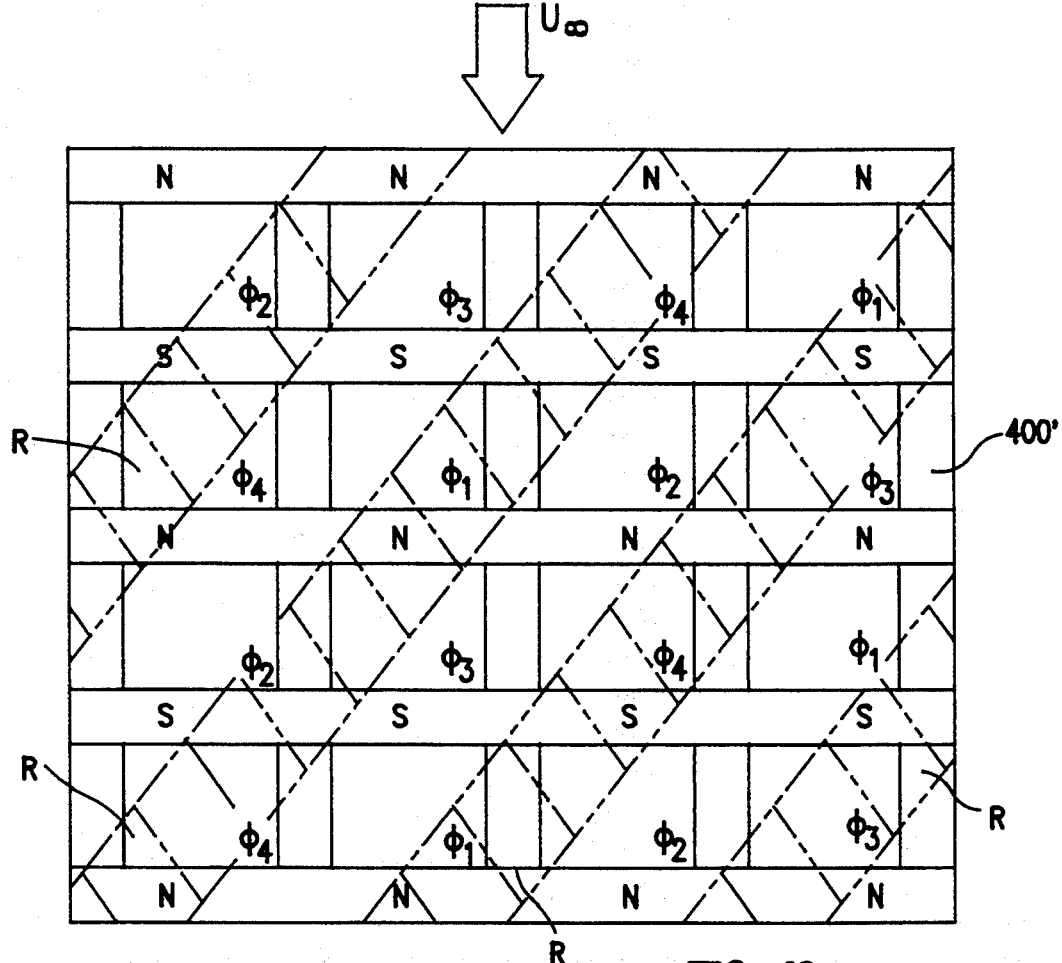
FIG. 12 is a plan view of the conceptualized flow conditions shown in FIG. 11.

FIGS. 11 and 12 conceptually illustrate flow phenomena believed to cause the dramatic decrease in viscous drag experienced by a flat plate equipped with an array of control region tiles arranged in accordance with the present invention and actuated at $f_{crit}$.

It will be recalled from the discussion in connection with FIG. 4 that gradients in the Lorentz force $\overline{L}$ cause vorticity in the near-wall region of the flow. A similar mechanism is believed to work with the embodiment shown in FIG. 10. However, in this embodiment the gradients in $\overline{L}$ are created by the components of $\overline{L}$ in the x- and y-directions, generated because the lines of magnetic flux and electric current in the flow actually curve as they enter and leave the surface of the plate. That is, by referring to FIG. 3, it can be appreciated that the path taken by the electric current between the electrodes 106 and 107 is actually curved, being curved proximate to the surface of the plate 100 at the electrodes and actually being parallel to the surface only at the mid-point between the electrodes. The same is true of the lines of magnetic flux. Thus, the magnetic field actually has a z component and the electric current actually has an x component. Accordingly, since $\overline{L} = \overline{J} \times \overline{B}$, $\overline{L} = [L_x, L_y, L_z]$ over the control region.

In a two-dimensional array of tiles, actuation of different tiles in a pattern results in a Lorentz force $\overline{L}(x,y,z,t)$ over the entire array. It is believed that an array in such accordance with the present invention, actuated at $f_{crit}$, will create a series of rotational-flow regions R in the boundary layer, as depicted in a highly conceptualized manner in FIGS. 11 and 12, without the necessity of providing a conductivity gradient in the fluid. The rotational-flow regions can be considered generally to move at a rate in the order of $U_\infty/2$ in the x-direction. It is believed that the relatively small variations in $L_x$, $L_y$ and $L_z$ over the surface of the array, and the periodic application of $\overline{L}$ to the flow at predetermined tiles as discussed above, continually reinforces the small amount of the vorticity created by the gradients of $\overline{L}$ over the array. This condition, which is analogous to resonance, causes the flow to organize as the periodic rotational-flow regions depicted conceptually in FIGS. 11 and 12.

Figure 13:
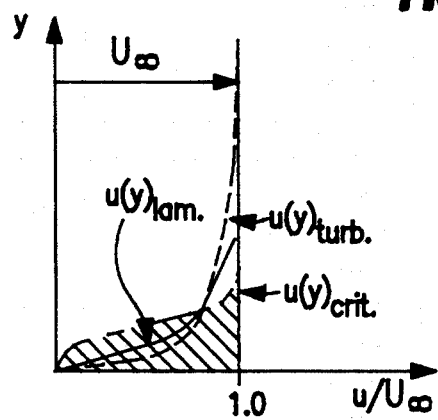
FIG. 13 conceptually depicts approximate boundary layer velocity profiles along a prior art flat plate and along a flat plate with the flow conditions depicted in FIGS. 11 and 12.
Figure 14:
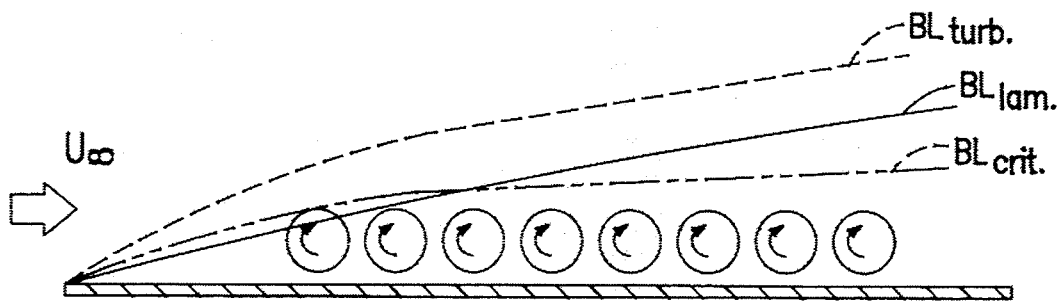
FIG. 14 conceptually depicts approximate boundary layer growth under the conditions shown in FIG. 13.

These flow conditions greatly reduce the drag on the plate 400' for reasons that can be understood by considering FIGS. 13 and 14. In FIG. 13, the lines marked $u(y)_{lam.}$ and $u(y)_{turb.}$ duplicate the plot in FIG. 2(a). The line marked $u(y)_{crit.}$ is believed to represent a possible configuration of the velocity profile in the boundary layer formed in the flow illustrated conceptually in FIGS. 11 and 12. The fluid velocity in the boundary layer under those conditions increases generally linearly because it can be thought of as being organized into the regions R shown in FIG. 11, and the fluid flow in such a region will vary generally linearly from the center of the region, as will be appreciated by those skilled in the art.

This flow condition is illustrated at the right-most region depicted in FIG. 11. At the freestream edge of the region, the fluid velocity is $U_\infty$ and at the plate 400 the fluid velocity is 0. Accordingly, the local velocity in the region x varies linearly from $-U_\infty/2$ at the plate surface to $+U_\infty/2$ at the freestream edge of the region. The velocity profile shown conceptually at the right in FIG. 11 and as $u(y)_{crit.}$ in FIG. 13 reflects this flow condition. (In FIG. 13 the velocity profile $u(y)_{crit.}$ is shown with an inflection near the plate surface to reflect the complex flow conditions in this very thin region, caused by the complex rotational flow patterns created in the flow by the present invention.)

It is this linear flow in the boundary layer that reduces the drag on the plate. In terms of the velocity profile u(y), drag D can be expressed as follows:

$$D = \rho \int_0^\infty \frac{u(y)}{U_\infty} \left(1 - \frac{u(y)}{U_\infty}\right) dy \quad (6)$$

where $\rho$ is the fluid's mass density.

The term in parentheses in equation 6 can be considered a measure of the "lost momentum" caused by the fluid velocity going to zero at the surface of the plate. Increasing that term increases the drag on the plate, since the "lost momentum" is manifested in a force on the plate in the x-direction. That term represents the area under the curve u(y) in FIG. 13, and it can be seen that the shaded region, which is the area under $u(y)_{crit.}$, is smaller than the comparable area under either $u(y)_{lam.}$ or $u(y)_{turb.}$, meaning that at any given location on the plate the drag is reduced by operating at $f_{crit.}$ using the arrangement shown in FIG. 10.

However, the drag is reduced even more dramatically than FIG. 13 would indicate, because it is believed the present invention inhibits boundary layer growth, as illustrated in FIG. 14. Thus, when the drag D in Equation 6 is integrated over the surface of the plate, the boundary layer flow achieved with the present invention, $BL_{crit.}$, substantially reduces drag as compared to either flow with a laminar boundary layer, $BL_{lam.}$, or a turbulent boundary layer, $BL_{turb.}$.

The critical frequency $f_{crit.}$ can thus be thought of as a resonant frequency, the value of which will depend on different factors and which will have minimum and maximum values for particular flow, conditions and array topologies. However, since the above-discussed flow can be thought of as a resonant condition, it may be possible to reduce the $\overline{L}$ force created in tiles further downstream. That is, once the flow is organized into patterns characteristic of the above-discusses aspect of the present invention, it may be that smaller $\overline{L}$ forces in following tiles will maintain that flow organization, which would reduce power requirements accordingly. It may also be possible to suitably actuate properly placed single control region tiles to organize and/or maintain such flow patterns.

Example No. 2

An array like that shown in FIG. 10 was tested in the flow channel discussed above in Example No. 1. A test array with overall dimensions of about 0.3 meters in the x-direction and about 0.4 meters in the z-direction. The test array had eight sub-arrays, actuated in a fashion indicated by the placement of the equal-phase tiles in FIG. 12. The test array included permanent magnets generating a peak transverse flux of about 6000 gauss in the center of each tile. The tiles were actuated by passing a peak current in an order of magnitude of about 100 ma/cm$^2$ between the pertinent electrodes. The flow velocity was about 30 cm/sec. The fluid was conductive, but no electrolyte was introduced to provide a conductivity gradient. A dye was used for flow visualization as in Example No. 1.

Figure 15:
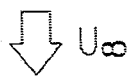
FIG. 15 is a plan view of an actual flow in a test set-up using an array similar to that shown in FIGS. 10(a) and 10(b), as visualized by a fluorescent dye.
Figure 15:

Equal-phase tiles were actuated under varying conditions. It was found that the flow organized itself as shown in FIG. 15 when each equal-phase tile was actuated for 750 msec. For a duty cycle of $\frac{1}{4}$ for equal-phase tiles, the critical frequency $f_{crit.}$ was thus 3 Hz (the reciprocal of 4×750 msec.). The bright regions extending obliquely across the plate in FIG. 15 are waves related to the rotational-flow regions depicted conceptually in FIGS. 11 and 12. The measured drag was reduced from about $10^{-1}$ N/m$^2$ to about $10^{-2}$ N/m$^2$, or approximately a 90% reduction.

It will be appreciated that magnetic boundary layer control devices such as discussed above could be provided on any surface upon which it is desired to control the boundary layer, either to prevent or cause separation, or to remove or induce instability.

The present invention provides a device that is simple to manufacture as discrete elements and which could be easily retrofit to craft presently in operation. Accordingly, the magnetic boundary layer control devices could be easily manufactured in large volume and delivered to a site of operation of the craft upon which it is to be installed. The devices could be easily fitted on the inside skin of the craft, for example on a submarine sail, with a minimum amount of time and effort.

Preliminary studies indicate that the power requirements for operational boundary layer control array devices according to the present invention would be extremely low. In addition, with the breakthroughs presently taking place with superconductivity, it may be possible to significantly reduce the power requirements of devices incorporating the present invention by the use of superconducting electromagnets.

Of course, it will be appreciated that the invention may take forms other than those specifically described, and the scope of the invention is to be determined solely by the following claims.

What is claimed is:

1. An apparatus for controlling a boundary layer in a flow of an electrically conductive fluid moving relative to a surface, said apparatus comprising:
   a plurality of selectively actuable control region tiles distributed over the surface, each said tile being bounded by magnetic field generating means for generating in the fluid a magnetic field $\overline{B}(x,y,z,t)$ having flux lines with a predetermined orientation with respect to the direction of relative movement of the fluid and the surface and electric current generating means for generating in the fluid an electric current density $\overline{J}(x,y,z,t)$ traversing the magnetic flux lines, wherein said magnetic field generating means and said electric current generating means are disposed relative to each other such that actuation of a particular tile generates a magnetic field $\overline{B}$ and electric current density $\overline{J}$ that create in the flow a force $\overline{L}(x,y,z,t) = \overline{J} \times \overline{B}$ having a non-zero component normal to the surface; and
   control means for selectively actuating said tiles to create the force $\overline{L}$ in the flow along selected said tiles for controlling the flow.

2. An apparatus according to claim 1, wherein the electric current density $\overline{J}$ is spatially constant for an actuated tile.

3. An apparatus according to claim 2, wherein the magnetic field $\overline{B}$ is spatially constant for an actuated tile.

4. An apparatus according to claim 1, wherein the component of the force $\overline{J} \times \overline{B}$ normal to the surface is in a direction toward the surface for stabilizing the boundary layer.

5. An apparatus according to claim 4, wherein the force $\overline{J} \times \overline{B}$ reduces the shear stress in the fluid at the surface.

6. An apparatus according to claim 4, wherein the force $\overline{J} \times \overline{B}$ maintains attached flow over the surface.

7. An apparatus according to claim 1, wherein the component of the force $\overline{J} \times \overline{B}$ normal to the surface of the wall is in a direction away from the surface for destabilizing the boundary layer.

8. An apparatus according to claim 7, wherein the force $\overline{J} \times \overline{B}$ induces turbulent fluid flow in the boundary layer.

9. An apparatus according to claim 7, wherein the force $\overline{J} \times \overline{B}$ induces the boundary layer to separate from the surface.

10. An apparatus according to claim 1, wherein said magnetic field generating means and electric current generating means generate a magnetic field having flux lines perpendicular to the electric current.

11. An apparatus according to claim 1, wherein the surface comprises a lifting surface.

12. An apparatus according to claim 11, wherein said lifting surface is a control surface.

13. An apparatus according to claim 1, wherein the fluid is liquid and the apparatus further includes conductivity altering means for bleeding an electrolyte into a near-wall region of the flow.

14. An apparatus according to claim 1, wherein the fluid is a gas and the apparatus further includes conductivity altering means for increasing the concentration of ions in the gas in a near-wall region of the flow.

15. An apparatus according to claim 1, wherein said electric current generating means comprises plural pairs of electrodes disposed with the flux lines of the magnetic field between said electrodes.

16. An apparatus according to claim 1, wherein said magnetic field generating means comprises plural permanent magnets.

17. An apparatus according to claim 1, wherein said magnetic field generating means comprises plural electromagnets.

18. An apparatus according to claim 1, further comprising modulating means for varying at least one of the density and orientation of at least one of the magnetic field $\overline{B}$ and electric current density $\overline{J}$.

19. An apparatus according to claim 1, further comprising plural said magnetic field generating means and plural said electric current generating means bounding said tiles in a two-dimensional array thereof.

20. An apparatus according to claim 19, wherein said control means actuates said tiles in a predetermined pattern.

21. An apparatus according to claim 20, wherein said control means actuates selected said tiles in plural groups thereof, the tiles in each group being actuated simultaneously.

22. An apparatus according to claim 21, wherein said plural groups of tiles are four in number and are arranged in sub-arrays, each including a tile from one of said four groups of tiles, and said two-dimensional array of tiles comprises a two-dimensional arrangement of said sub-arrays.

23. An apparatus according to claim 22, wherein said control means actuates said selected tiles such that adjacent said tiles are not actuated.

24. An apparatus according to claim 19, wherein each of said control region tiles is bounded by a first permanent primary magnet on one side thereof having the North pole thereof facing the surface and second permanent primary magnet on an opposite side thereof having the South pole thereof facing the surface.

25. An apparatus according to claim 24, further including a permanent linking magnet under the surface, wherein the North pole of said linking magnet is proximate to said first primary magnet and the South pole of said linking magnet is proximate to said second primary magnet.

26. An apparatus according to claim 24, wherein a single one said primary magnet comprises said magnetic field generating means for at least two adjacent said control region tiles.

27. An apparatus according to claim 24, wherein:
   said electric current generating means comprises selectively actuable electrodes bounding opposing sides of each said control region tile; and
   said control means selectively actuates said electrodes associated with each said control region tile in a predetermined pattern.

28. An apparatus according to claim 27, wherein:

a single said primary magnet comprises said magnetic generating means for at least two adjacent said control region tiles;

said electric current generating means comprises selectively actuable bounding opposing sides of each said control region tile, a single said electrode comprising said electric current generating means for at least two adjacent said control region tiles; and said control means selectively actuates said electrodes in a predetermined pattern such that said electrodes in adjacent said tiles are not actuated at the same time.

29. An apparatus according to claim 19, wherein said magnetic field generating means comprises a magnet extending under the surface of each control region tile and having a North pole at one boundary of said tile and a South pole at an opposing boundary of said tile.

30. A device for travelling through a fluid medium having a predetermined conductivity, the device comprising:

a surface contacting the fluid medium so that a boundary layer is formed on said surface; and flow control means including a plurality of selectively actuable control region tiles distributed over said surface, each said tile being bounded by magnetic field generating means for generating in the fluid a magnetic field $\overline{B}(x,y,z,t)$ having flux lines with a predetermined orientation with respect to the flow over said surface and electric current generating means for generating in the fluid an electric current density $\overline{J}(x,y,z,t)$ traversing the magnetic flux lines, wherein said magnetic field generating means and said electric current generating means are disposed relative to each other such that actuation of a particular tile generates a magnetic field $\overline{B}$ and electric current density $\overline{J}$ that create in the flow a force $\overline{L}(x,y,z,t) = \overline{J} \times \overline{B}$ having a non-zero component normal to said surface, said flow control means further including control means for selectively actuating said tiles to create the force $\overline{L}$ in the flow along selected said tiles for controlling the flow.

31. A device according to claim 30, further comprising plural said magnetic field generating means and plural said electric current generating means bounding said tiles in an array thereof wherein said control means actuates said tiles in a predetermined pattern.

32. A device according to claim 31, wherein said array extends in two directions along said surface.

33. An apparatus for controlling a flow of an electrically conductive fluid moving relative to a surface, said apparatus comprising:

magnetic field generating means for generating a magnetic field $\overline{B}(x,y,z,t)$ having magnetic flux lines in the fluid;

electric current generating means for generating in the fluid an electric current density $\overline{J}(x,y,z,t)$ traversing the magnetic flux lines, said electric current generating means being disposed in a predetermined orientation relative to said magnetic field generating means; and control means for varying over time at least one of the density and orientation of at least one of the magnetic field $\overline{B}$ and electric current density $\overline{J}$ such that the magnetic field $\overline{B}$ and the electric current density create in the flow a force $\overline{L}(x,y,z,t) = \overline{J} \times \overline{B}$ for controlling the flow, the force $\overline{L}$ having a non-zero component normal to the surface.

34. An apparatus according to claim 33, wherein said control means varies the orientation of the magnetic field $\overline{B}$ and electric current density $\overline{J}$ to reduce drag on the surface.

35. An apparatus according to claim 34, wherein the surface is a lifting surface.

36. A method for determining flow control for a flow of an electrically conductive fluid moving relative to a surface, said method comprising the steps of:

determining a magnetic field $\overline{B}(x,y,z,t)$ having magnetic flux lines to be provided in the fluid by a magnetic field generator;

determining an electric current density $\overline{J}(x,y,z,t)$ to be provided in the fluid by an electric current generator such that the electric current density traverses the magnetic flux lines in the fluid; and determining the variations over time to be provided in the magnetic field $\overline{B}$ and the electric current $\overline{J}$ and the relative positions and densities at which the magnetic field $\overline{B}$ and the electric current density $\overline{J}$ are to be provided with respect to the mean-flow direction of the fluid, such that the magnetic field and the electric current create in the fluid a force $\overline{L}(x,y,z,t) = \overline{J} \times \overline{B}$ for controlling the flow, the force $\overline{L}$ having a non-zero component normal to the surface.

* * * * *

UNITED STATES PATENT AND TRADEMARK OFFICE
CERTIFICATE OF CORRECTION

PATENT NO. : 5,437,421

DATED : August 1, 1995

INVENTOR(S) : DANIEL M. NOSENCHUCK ET AL.         Page 1 of 2

It is certified that error appears in the above-identified patent and that said Letters Patent is hereby corrected as shown below:

ON THE COVER PAGE

At [57] Abstract

Line 10, "an" should read --a--.

IN THE DRAWINGS

Sheet 10

FIG. 11, "z" should read --x--.

COLUMN 5

Line 14, "of" should read --Of--;

Line 28, "106." should read --106--; and

Line 33, "arrows 31," should read
　　　　--arrows 131,--.

COLUMN 8

Line 8, "ill" should read --in--;

UNITED STATES PATENT AND TRADEMARK OFFICE
CERTIFICATE OF CORRECTION

PATENT NO. : 5,437,421

DATED : August 1, 1995

INVENTOR(S) : DANIEL M. NOSENCHUCK ET AL.

It is certified that error appears in the above-identified patent and that said Letters Patent is hereby corrected as shown below:

COLUMN 8

Line 51, "-decrease" should read --decrease--;

Line 57, "since a" should read --since--; and

Line 60, "control" should read --control.--.

COLUMN 10

Line 39, "print" should read --print of--.

COLUMN 14

Line 15, ", conditions" should read --conditions--.

Signed and Sealed this

Seventh Day of May, 1996

Attest:

BRUCE LEHMAN

Attesting Officer     Commissioner of Patents and Trademarks